(12) United States Patent
Chretien et al.

(10) Patent No.: US 8,303,699 B2
(45) Date of Patent: Nov. 6, 2012

(54) PHOTO-ERASABLE INK FOR FULL COLOR PRINTING

(75) Inventors: Michelle N. Chretien, Mississauga (CA); Gabriel Iftime, Mississauga (CA); Tyler B. Norsten, Oakville (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1240 days.

(21) Appl. No.: 12/103,368

(22) Filed: Apr. 15, 2008

(65) Prior Publication Data

US 2009/0258156 A1  Oct. 15, 2009

(51) Int. Cl.
*C09D 11/02*  (2006.01)

(52) U.S. Cl. ............... 106/31.28; 106/31.23; 106/31.32; 106/31.64

(58) Field of Classification Search ............... 106/31.23, 106/31.32, 31.64, 31.28
See application file for complete search history.

(56) References Cited

U.S. PATENT DOCUMENTS

| | | | | |
|---|---|---|---|---|
| 5,534,051 A * | 7/1996 | Lauw | .................... | 106/31.43 |
| 6,060,223 A | 5/2000 | Nohr et al. | | |
| 6,120,839 A | 9/2000 | Comiskey et al. | | |
| 2005/0191492 A1 | 9/2005 | Yadav | | |
| 2006/0137841 A1 | 6/2006 | Chatani et al. | | |
| 2006/0210798 A1 * | 9/2006 | Burda | ............ | 428/402 |
| 2010/0255215 A1 * | 10/2010 | Han et al. | ............ | 427/558 |

FOREIGN PATENT DOCUMENTS

| | | |
|---|---|---|
| JP | A-2003-73587 | 3/2003 |
| WO | WO 2004/053938 A2 | 6/2004 |
| WO | WO 2005/014736 A1 | 2/2005 |
| WO | WO 2007/130561 A2 | 11/2007 |

OTHER PUBLICATIONS

A. Hagffeldt, M. Gratzel (1995) Chem. Rev. 95 49-68.
T. Trinidade, P. O'Brien, N.L. Pickett (2001) Chem. Mater. 13 3843-3858.
M. Stylidi, D.I. Kondarides, Z.E. Verykios (2003) Appl. Catal. B 40 271.286.
Y. Wang (2000) Water Res. 34 990-994.
A. Linsebigler (1995) Chem. Rev. 95 735-758.
P.D. Cozzoli, R. Comparelli, e. Fanizza, M.L. Curri, A. Agostiano (2003) Mater. Sci. Eng. C 23 707-713.
Database WPI Week 200333, Thomson Scientific, London, GB; AN 2003-347440, XP002537900.

* cited by examiner

*Primary Examiner* — Melvin C Mayes
*Assistant Examiner* — Veronica F Faison
(74) *Attorney, Agent, or Firm* — Oliff & Berridge, PLC

(57) ABSTRACT

An ink compatibility including a dye and surface functionalized photocatalytically active semiconductor nanoparticles is provided. This ink composition enables the reuse of a print substrate, because the surface functionalized photocatalytically active semiconductor nanoparticles bleach the dye under an activating radiation.

26 Claims, No Drawings

PHOTO-ERASABLE INK FOR FULL COLOR PRINTING

TECHNICAL FIELD

This disclosure is generally directed to improved photo-erasable inks. In particular, this disclosure provides an improved ink composition containing a dye and photocatalytically active semiconductor nanoparticles that are surface functionalized.

BACKGROUND

Reusable document technologies allow a print substrate, such as paper, to be printed upon more than one time. Whereas non-reusable document printing has a high environmental impact as a result of disposal of the substrate, reusable paper (for example) can provide economic and environmental advantages for routine printing needs. One method of reusable printing is to bleach the ink printed onto the substrate, such that new ink can be printed on top of the non-visible bleached ink.

Semiconductor metal oxides are among the most commonly used photocatalytic materials for the decomposition of organic molecules. Such semiconductor metal oxides have been used for the photodegradation of a variety of compounds, including surfactants, pesticides, and dyes. In the presence of air, humidity, and light, many semiconductor metal oxides produce reactive species that can initiate the photodegradation of organic molecules such as dyes.

For example, doped and undoped titanium dioxide ($TiO_2$) and zinc oxide (ZnO) nanoparticles (30-50 nm) have been extensively applied to the photobleaching of dyes in wastewater from textile processing and the photocatalytic removal of other aqueous pollutants. For example, Agostiano et al. have shown that titanium dioxide can be used to bleach textile dye Uniblue A. P. D. Cozzoli, R. Comparelli, E. Fanizza, M. L. Cut, A. Agostiano (2003) Mater. Sci. Eng. C 23 707-713, the text of which is hereby incorporated in its entirety. The generation of reactive species is a surface phenomenon, so the catalytic efficiency of these materials can be improved through the use of nanoparticle-sized materials.

A variety of publications discuss the use of photocatalytic particles in the context of printing. For example, U.S. Patent Application Publication No. 2006/0137841 to Chatani et al. describes a printing paper substrate that is coated with photocatalytically active titanium dioxide particles. The titanium dioxide provides an "air cleaning effect" as well as "good printability" and "good color print quality." Chatani does not discuss reusing the substrate by utilizing the photocatalytically active particles to bleach an ink.

In Japanese Patent Application Publication No. 2003-073587, there is provided an ink composition that is erasable by light irradiation. Specifically, there is provided an aqueous ink composition comprising a dye and titanium oxide nanoparticles that act as photocatalysts.

However, dye based inks may comprise a wide variety of solvents, not merely aqueous solutions, in order to achieve particular desired compositions or drying properties. Solvent-based inks are popular for numerous printing applications. On the other hand, the ink disclosed by JP 2003-073587 is limited to aqueous solutions, because titanium oxide is not easily disperable in other systems such as organic solutions.

Furthermore, titanium oxide is poorly disperable even in aqueous environments, thus requiring the use of a wetting agent as disclosed in JP 2003-073587. The use of a wetting agent is unlikely to achieve the dispersion quality and stability necessary for demanding print applications, such as ink jet. As a result of poor dispersability, the photocatalytic bleaching effect may be uneven. Such unevenness can result in portions of the printed image remaining visible, thus making the substrate not reusable, and thereby defeating the purpose of using such a system.

Therefore, there exists in the art a need for improved photo-erasable inks.

SUMMARY

The present disclosure addresses these and other needs, by providing an improved photo-erasable ink composition. More particularly, this disclosure provides an improved photo-erasable ink composition containing photocatalytically active semiconductor nanoparticles that are surface functionalized so as to make the nanoparticles disperable in a wide variety of ink media.

In embodiments, the disclosure provides an ink comprising a dye, a carrier and surface functionalized photocatalytically active semiconductor nanoparticles, wherein the dye is bleached by the surface functionalized photocatalytically active semiconductor nanoparticles upon exposure of the ink to an activating radiation.

In other embodiments, the disclosure provides a printer comprising a full color ink set made from the ink composition comprising a dye, a carrier and surface functionalized photocatalytically active semiconductor nanoparticles. In another embodiment, the disclosure provides a printed document wherein the ink composition comprising a dye, a carrier and surface functionalized photocatalytically active semiconductor nanoparticles is printed on a substrate.

Finally, in another embodiment, the disclosure provides a method of printing a substrate comprising printing a substrate with the ink composition comprising a dye, a carrier and surface functionalized photocatalytically active semiconductor nanoparticles to form a printed substrate having a first printed image, exposing the printed substrate to an activating radiation such that the ink is substantially wholly bleached, and then printing the substrate again to form a printed substrate having a second printed image.

EMBODIMENTS

This disclosure is not limited to particular embodiments described herein, and some components and processes may be varied by one of ordinary skill in the art, based on this disclosure. The terminology used herein is for the purpose of described particular embodiments only, and is not intended to be limiting.

In this specification and the claims that follow, singular forms such as "a," "an," and "the" include plural forms unless the content clearly dictates otherwise. In addition, reference may be made to a number of terms that shall be defined as follows:

The term "bleaching" is defined as the disappearance of all or substantially all color contrast, as between an ink exposed to an activating radiation and an unexposed ink. For example, bleaching is said to occur when the color contrast between the substrate and the erased image is no longer perceptible to the viewer. Specifically, bleaching at least includes any color difference between the substrate and the erased image that is measured to be less than about $\Delta E=5$ where $\Delta E$ is defined according to CIE76 as $\Delta E = \sqrt{(L^*_2 - L^*_1)^2 + (a^*_2 - a^*_1)^2 + (b^*_2 - b^*_1)^2}$.

An improved ink composition comprising a dye and surface functionalized photocatalytically active semiconductor nanoparticles, wherein the dye is bleached by the surface functionalized photocatalytically active semiconductor nanoparticles upon exposure of the ink to an activating radiation, is provided.

An ink, as is generally known, is a printable composition containing a colorant that is used to colorize a print substrate. In embodiments, the ink of the present disclosure may take any of various known forms, for example the ink may be a liquid ink, a solid ink, a gel ink or a radiation curable ink. The ink of the present disclosure may also comprise any of various known solvent bases as a carrier. For example, in embodiments, the carrier may be an aqueous solvent. In other embodiments, the carrier may be an organic phase, or wax or gel based.

A dye, as is generally known, is a type of colorant that is soluble in an ink. Any desired or effective colorant can be employed in the ink compositions, including dye, mixtures of dyes, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like. Dyes are classified into several dye classes, for example acid or base dyes, reactive dyes, sulfur dyes or azo dyes. In the present disclosure, the dye may be a member of any of the various known dye classes, as the photo-bleaching mechanism is relatively insensitive to the dye structure. The choice of dye structure will ultimately depend on the desired color and ink vehicle.

Examples of dyes include EASTMAN olefin, USHARECT Blue 86 (Direct Blue 86), available from USHANTI Color; INTRALITE Turquoise 8GL (Direct Blue 86), available from Classic Dyestuffs; CHEMICTIVE Brilliant Red 7BH Reactive Red 4), available from Chemiequip; LEVAFIX Black EB, available from Bayer; REACTRON Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; CARTASOL Yellow 6GF, available from Clariant; CARTA Blue 2GL, available from Clariant; and the like. Examples of suitable spirit solvent dyes include NEOZAPON Red 492 (BASF); ORASOL Red G (Ciba); Direct Brilliant Pink B (Global Colors); AIZEN SPILON Red C-BH (Hodogaya Chemical); KAYANOL Red 3BL (Nippon Kayaku); Spirit Fast Yellow 3G; AIZEN SPILON Yellow C-GNH (Hodogaya Chemical); CARTASOL Brilliant Yellow 4GF (Clariant); PERGASOL Yellow CGP (Ciba); ORASOL Black RLP (Ciba); SAVINYL Black RLS (Clariant); MORFAST Black Conc. A (Rohm and Haas); ORASOL Blue GN (Ciba); SAVINYL Blue GLS (Sandoz); LUXOL Fast Blue MBSN (Pylam); SEVRON Blue 5GMF (Classic Dyestuffs); BASACID Blue 750 (BASF), and the like. NEOZAPON Black X51 (C.I. Solvent Black, C.I. 12195) (BASF), Sudan Blue 670 (C.I. 61554) (BASF), Sudan Yellow 146 (C.I. 12700) (BASF), and Sudan Red 462 (C.I. 260501) (BASF) are particularly suitable in some embodiments. This list is not intended to be comprehensive or limiting. These dyes may be used singly or in combination.

The surface functionalized photocatalytically active semiconductor nanoparticles can be any of various known semiconductor materials that are photocatalytically active. For example, in embodiments, the photocatalytically active semiconductor nanoparticles can be made from titanium oxides (TiO, $TiO_2$, $Ti_2O_3$), zinc oxide (ZnO), $Nb_2O_5$, $SrTiO_3$, $SnO_2$, $ZrO_2$, ZnS, $\alpha$-$Fe_2O_3$, $CeO_2$, CdS, GaP, $WO_3$, $Fe_2O_3$, CdSe, $InTaO_4$, $MoO_3$, $WS_2$, $MoS_2$, $Ta_2O_5$, Si, and mixtures thereof. In a particular embodiment, the semiconductor nanoparticles are made of titanium dioxide.

The photocatalytically active semiconductor material is in the form of nanoparticles in order to enhance surface reactivity by providing an increased surface area to volume ratio. In embodiments, the nanoparticles have an average diameter of less than about 300 nm. A average diameter of less than 200 nm, for example, ensures that the nanoparticles are not visible to the naked eye. In particular embodiments, the nanoparticles have an average diameter of between about 5 nm and 30 nm.

The "average" nanoparticle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be measured by methods that use light scattering technology to infer particle size, such as Dynamic Light Scattering. The term "particle diameter" as used herein refers to the length of the nanoparticle at the longest dimension (in the case of acicular shaped particles) as derived from images of the particles generated by Transmission Electron Microscopy (TEM).

The photocatalytically active semiconductor nanoparticles may be doped or undoped, depending on the desired redox properties. If doped, the photocatalytically active semiconductor nanoparticles may be doped with various known dopants, as is generally known in the art. In embodiments, the photocatalytically active semiconductor nanoparticles may be doped with silicon, silicon oxides, chromium, manganese, cobalt, nitrogen, lanthanide oxides, iron, vanadium, silver, copper, gold, carbon, fluorine, sulfur and mixtures thereof. In some embodiments, the inclusion of dopants may affect the photocatalytic activity of the semiconductor nanoparticles by, for example, shifting the wavelength of the activating radiation or by improving catalytic efficiency.

The surface functionalizing compound that makes the photocatalytically active semiconductor nanoparticles surface functionalized may be any of a variety of known compounds having a first portion that bonds with the semiconductor nanoparticles and a second portion that is compatible with the ink vehicle. The surface functionalization may take place through processes such as, for example, direct chemical bonding, chemisorption or physisorption.

Generally, the surface functionalizing compound may be one or more of alcohols, diols, polyols, acrylates, acrylic acid, polyacrylates, substituted primary amines, secondary amines, carboxylic acids, trihalo-silyl groups, trialkyl-silyl groups, trialkoxy silyl groups, sulfonic acids, ethylene oxides and propylene oxides. Each of the forgoing may be long or short chain, branched, and substituted or ethylenically unsaturated, as desired and generally known in the art. A long chain compound generally has between about 4 and about 20 carbon atoms, while a short chain compound generally has at most 12 carbon atoms.

Examples of the surface functionalizing compounds include ethanol, isopopanol, butanol, glycol, glycols, polyethylene glycol or diethylene glycol; primary and secondary amines of structure type $R_1$-$NHR_2$ where $R_1$ is any long or short chain, branched, or substituted alkyl, aryl, alkoxy, aryloxy, or ethylenically unsaturated group, such as butyl amine, tributylamine or aminobutylacrylate; mono- and di-carboxylic acids; 3-(methoxysilyl)propyl (meth)acrylate; mono- and di-sulfonic acids; and polyethyleneoxide or polypropyleneoxide.

The specific surface functionalizing compound used depends on both the ink vehicle environment and the semiconductor material comprising the nanoparticle. Specifically, different types of ink solvent environment will require different types of surface functionalizing compounds in order to make the semiconductor nanoparticles dispersable therein.

The surface functionalization compound may be added to the semiconductor material in an amount such that from about 0.01% to about 75% of the total surface area of an average semiconductor nanoparticle is surface functionalized.

As a result of being surface functionalized, the semiconductor nanoparticles are highly dispersed throughout the ink. This increased dispersion may affect the photocatalytic bleaching in a variety of ways. For example, it is believed that because the nanoparticles are uniformly dispersed throughout the ink, fewer nanoparticles may be used than would be required with non-surface functionalized nanoparticles in order to achieve the same level of bleaching. In this way, the ink may comprise a weight percent of surface functionalized photocatalytically active semiconductor nanoparticles of from about 0.5% to about 50%. In embodiments, the weight percent of surface functionalized photocatalytically active semiconductor nanoparticles may be from about 1 to about 20%.

Additionally, it is believed that the presence of the surface functionalization compound on the semiconductor materials may also result in faster bleaching. It is hypothesized that the surface functionalizing species could be oxidized or reduced by the semiconductor nanoparticles to generate a reactive species, which is more active towards the dye or has a longer lifetime, giving it a higher probability of reacting with the dye.

The above discussed features and advantages were highly unexpected because surface functionalization has been applied to modulate or reduce the photocatalytic activity of semiconductor nanoparticles, in applications such as sunscreens. On the other hand, in this case, the amount of surface functionalization necessary to achieve dispersability did not negatively impact the catalytic effect.

The activating radiation may be any radiation known to activate the semiconductor material in the ink composition. As is generally known in photocatalytic semiconductor systems, the activating radiation causes photogenerated electrons and holes to migrate to the surface of the semiconductor nanoparticle where they act as sources of redox species ultimately leading to the destruction of the dye.

In embodiments, the activating radiation may one or more types of radiation selected from the group consisting of: ultraviolet radiation (having a wavelength of about 100 nm to about 400 nm), visible radiation (having a wavelength of about 400 nm to about 700 nm), infrared radiation (having a wavelength of about 700 nm—to about $1*10^6$ nm), thermal radiation, and microwave radiation (having a wavelength of about $1*10^6$ nm to about 0.1 m). In a particular embodiment, the activating radiation is ultraviolet radiation having a wavelength, or a band of wavelengths, ranging from about 200 nm to about 380 mm.

The ink composition is exposed to the activating radiation for a time period sufficient to substantially wholly bleach the ink. In embodiments, substantially complete bleaching takes place in a time period of less than about five minutes of exposure to the activating radiation. In particular embodiments, the time period of exposure to the activating radiation sufficient to substantially wholly bleach the ink is about 1 minute.

As various semiconductor materials are activated by different types of radiation, the activating radiation should be suitably chosen according to the semiconductor material species used. Alternatively, the species of semiconductor material used may be chosen depending on a desired type of activating radiation. For example, in embodiments, when the activating radiation is ultraviolet radiation, the semiconductor material is one having a band gap between about 6.6 eV and about 3.0 eV. Such semiconductor materials responsive to ultraviolet activating radiation include, for example, titanium oxides ($TiO$, $TiO_2$, $Ti_2O_3$), zinc oxide ($ZnO$), $Nb_2O_5$ and niobium oxides, $SrTiO_3$, $SnO_2$, $ZrO_2$ $ZnS$, $\alpha$-$Fe_2O_3$, and $CeO_2$. In other embodiments, when the activating radiation is infrared radiation, the semiconductor material is one having a band gap between about 3.0 eV and about 1.0 eV. Examples of semiconductor materials that are responsive to visible radiation include $CdS$, $GaP$, $WO_3$, $Fe_2O_3$, $CdSe$, $InTaO_4$, $MoO_3$, $WS_2$, $MoS_2$, $Ta_2O_5$, and $Si$.

Finally, the ink may also further comprise an optional surfactant. The surfactant may enable catalytic systems such as in the present disclosure to be more efficient, by acting as a carrier of reactive radical species. In embodiments, the ink may comprise from about 1% to about 30% of a surfactant. For example, the surfactant may be, in embodiments alkyl sulfate or sulfonate salts, alkylammonium salts, alkyl esters, fatty alcohols such as cetyl or oleyl alcohol, alkyl poly(ethylene oxide) and copolymers of poly(ethylene oxide) and poly(propylene oxide) (commercially called Poloxamers or Poloxamines), alkyl polyglucosides, polyether modified polydimethylsiloxanes, having the stricture:

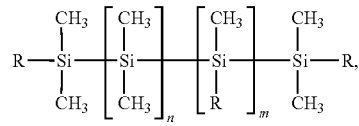

wherein the R groups are functional modifications, and fluorosurfactants.

The ink composition of the present disclosure, as described above, may be incorporated into a full color ink set. A full color ink set, made up of at least two inks each comprising substantially similar components but differently colored dyes, can easily be manufactured. In this way, a full color ink set comprising, for example, a cyan ink, a magenta ink, a yellow ink and a black ink can be made wherein each of the four inks, or any subset thereof, is an ink according the present disclosure containing surface functionalized photocatalytically active semiconductor nanoparticles.

The full color ink set may then be included in an ink printer. The ink printer may be any type of ink printer, such as, for example, a desktop ink-jet printer or a web offset press. In embodiments, the printer may be a conventional printer wherein the ink set of the present disclosure is substituted for a conventional ink set. In other embodiments, the printer may be a printer further including an activating radiation source such that reused documents may be both bleached and reprinted within one system. The ink may also optionally be applied to substrate using, for example, a fountain pen or felt-tip pen.

The printer may then print the ink of the present disclosure on a print substrate to create a printed document. The print substrate may be any conventional print substrate, such as white or colored paper, or clear or colored plastic.

Accordingly, a method of printing a substrate using the above described photo-erasable ink is also provided. The method includes the steps of printing a substrate using the above described ink with a first image to form a printed substrate, exposing the printed substrate to an activating radiation such that the ink is substantially wholly bleached, and then printing the substrate with a second image. In this way, an individual substrate may be reused at least two times. The above method may be repeated several times using the same substrate, although the substrate may eventually degrade as a result of becoming saturated with the ink.

The disclosure will be illustrated in greater detail with reference to the following Example, but the disclosure should not be construed as being limited thereto. In the following example, all the "parts" are given by weight unless otherwise indicated.

EXAMPLE

A first ink composition was made as a comparative example. Ink 1 was made by dissolving 15 mg of crystal violet (available commercially from Sigma-Aldrich) in 5 ml distilled water.

A second ink composition made according to the present disclosure. Ink 2 was made by dissolving 15 mg of crystal violet and 200 mg of surface functionalized titanium dioxide nanoparticles in 5 ml distilled water. The titanium dioxide nanoparticles were surface functionalized with diethylene glycol, and had a average particle size of 16 nm (as measured by dynamic light scattering).

Each ink was placed in between two glass slides to obtain a film. About half of each sample was exposed to ultraviolet light (having a wavelength of 312 nm) for about 1 minute. It was observed that the radiation exposed areas of the sample containing the nanoparticles faded completely, while there is no visible fading of the exposed area of the ink containing no nanoparticles. In this way, the surface treated titanium dioxide achieved substantially complete bleaching in a short period of time.

This demonstrates the bleaching process based on the photo-catalytic effect obtained by using invisible surface functionalized titanium dioxide nanoparticles.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink comprising:
   a dye;
   a carrier; and
   surface functionalized photocatalytically active semiconductor nanoparticles;
   wherein the dye is substantially completely bleached by the surface functionalized photocatalytically active semiconductor nanoparticles upon exposure of the ink to an activating radiation within a time period of less than about 5 minutes.

2. The ink of claim 1, wherein the surface functionalized photocatalytically active semiconductor nanoparticles are dispersible in at least one of a carrier material selected from the group consisting of a wax, a gel, an organic solvent, an aqueous solvent, and mixtures thereof.

3. The ink of claim 2, wherein the surface functionalized photocatalytically active semiconductor nanoparticles are dispersible in an organic solvent carrier.

4. The ink of claim 1, wherein the surface functionalized photocatalytically active semiconductor nanoparticles are comprised of a material having a band gap between about 6.6 eV and about 1.0 eV.

5. The ink of claim 1, wherein the surface functionalized photocatalytically active semiconductor nanoparticles are comprised of a material selected from the group consisting of $TiO$, $TiO_2$, $Ti_2O_3$, $ZnO$, $Nb_2O_5$, $SrTiO_3$, $SnO_2$, $ZrO_2$, $ZnS$, $\alpha\text{-}Fe_2O_3$, $CeO_2$, $CdS$, $GaP$, $WO_3$, $Fe_2O_3$, $CdSe$, $InTaO_4$, $MoO_3$, $WS_2$, $MoS_2$, $Ta_2O_5$, $Si$, and mixtures thereof.

6. The ink of claim 5, wherein the surface functionalized photocatalytically active semiconductor nanoparticles are titanium dioxide nanoparticles.

7. The ink of claim 1, wherein the surface functionalized photocatalytically active semiconductor nanoparticles are surface functionalized with one or more compounds selected from the group consisting of alcohols, diols, polyols, acrylates, acrylic acid, polyacrylates, substituted primary amines, secondary amines, carboxylic acids, trihalo-silyl groups, trialkyl-silyl groups, trialkoxy silyl groups, sulfonic acids, ethylene oxides and propylene oxides.

8. The ink of claim 1, wherein the surface functionalized photocatalytically active semiconductor nanoparticles are surface functionalized through one or more processes selected from the group consisting of direct chemical bonding, chemisorption and physisorption.

9. The ink of claim 1, wherein the surface functionalized photocatalytically active semiconductor nanoparticles are surface functionalized with an amount of a surface functionalization compound ranging from about 0.01% to about 75% of the total surface area of the semiconductor nanoparticle.

10. The ink of claim 1, wherein the surface functionalized photocatalytically active semiconductor nanoparticles comprise a doped semiconductor material.

11. The ink of claim 10, wherein the surface functionalized photocatalytically active semiconductor nanoparticles are doped with a material selected from the group consisting of silicon, silicon oxides, chromium, manganese, cobalt, nitrogen, lanthanide oxides, iron, vanadium, silver, copper, gold, carbon, fluorine and sulfur.

12. The ink of claim 1, wherein the surface functionalized photocatalytically active semiconductor nanoparticles comprise an undoped semiconductor material.

13. The ink of claim 1, wherein the ink further comprises a surfactant.

14. The ink of claim 1, wherein the surface functionalized photocatalytically active semiconductor nanoparticles have an average diameter of less than about 300 nm.

15. The ink of claim 1, wherein the surface functionalized photocatalytically active semiconductor nanoparticles have an average diameter of from about 10 nm to about 30 nm.

16. The ink of claim 1, wherein the ink is one of a liquid ink, a solid ink, a gel ink, and a radiation curable ink.

17. The ink of claim 1, wherein the activating radiation is one or more types of radiation selected from the group consisting of ultraviolet radiation, visible radiation, infrared radiation, thermal radiation, and microwave radiation.

18. The ink of claim 17, wherein the activating radiation is ultraviolet radiation having a wavelength, or a band of wavelengths, ranging from about 200 nm to about 380 nm.

19. An ink comprising:
a dye;
surface functionalized photocatalytically active titanium dioxide nanoparticles; and
an aqueous or organic solvent;
wherein the dye is substantially completely bleached by the surface functionalized photocatalytically active titanium dioxide nanoparticles upon exposure of the ink set to radiation within a time period of less than about 5 minutes; and
wherein the surface functionalized photocatalytically active titanium dioxide nanoparticles are surface functionalized with diethylene glycol.

20. A full color ink set comprising first and second inks of claim 1, wherein the first ink comprises a dye having a first color; and the second ink comprises a dye having a second color, the second color being different from the first color.

21. A printer comprising the full color ink set of claim 20.

22. A printed document wherein the ink of claim 1 is printed on a substrate.

23. The printed document of claim 22, wherein the substrate is a material selected from the group consisting of white paper, colored paper, clear plastic and colored plastic.

24. The printed document of claim 22, wherein the bleaching results in a color difference between the substrate and the ink that is less than about $\Delta E=5$.

25. A method of printing a substrate comprising printing a substrate with the ink of claim 1 to form a printed substrate having a first printed image, exposing the printed substrate to an activating radiation such that the ink is substantially completely bleached, and then printing the substrate to form a printed substrate having a second printed image.

26. An ink comprising:
a dye;
surface functionalized photocatalytically active titanium dioxide nanoparticles; and
an organic solvent;
wherein
the dye is substantially completely bleached by the surface functionalized photocatalytically active titanium dioxide nanoparticles upon exposure of the ink set to ultraviolet radiation ranging from about 200 nm to about 380 nm within a time period of less than about 5 minutes;
the surface functionalized photocatalytically active titanium dioxide nanoparticles are surface functionalized with diethylene glycol; and
the ink comprises a weight percent of the surface functionalized photocatalytically active semiconductor nanoparticles of from about 0.5% to about 50%.

* * * * *